May 25, 1965  C. LAGACÉ  3,185,497
AUTOMOBILE BACK-REST

Filed Sept. 23, 1963  2 Sheets-Sheet 1

INVENTOR
Charles LAGACÉ
BY
Pierre Lespérance
PATENT AGENT

May 25, 1965  C. LAGACÉ  3,185,497
AUTOMOBILE BACK-REST
Filed Sept. 23, 1963  2 Sheets-Sheet 2

INVENTOR,
Charles LAGACÉ
BY Pierre Lespérance
PATENT AGENT

United States Patent Office 3,185,497
Patented May 25, 1965

3,185,497
AUTOMOBILE BACK-REST
Charles Lagacé, St. Quentin, New Brunswick, Canada
Filed Sept. 23, 1963, Ser. No. 310,774
4 Claims. (Cl. 280—150)

The present invention relates to a cushion arrangement more particularly designed for use in motor vehicles as a back-rest.

The general object of the present invention resides in the provision of a cushion arrangement of the character described, of improved construction to provide maximum comfort for the user, said cushion arrangement consisting essentially of a head-rest and two spaced longitudinally extending legs, to support the sides of the user's back so as to provide a bucket-seat effect.

Another object of the present invention resides in the provision of a cushion arrangement of the character described, in which the head-rest and two legs are adjustably positioned so as to adjust the spacing between the two legs and also adjust the level of the head-rest in accordance with the desire of the particular user.

Yet another object of the present invention resides in the provision of a cushion arrangement of the character described, in which said legs can each be folded in half longitudinally about themselves to double the thickness of each to therefore achieve a deeper bucket-seat effect.

Another object of the invention resides in a cushion arrangement of the character described, made of three independently inflatable elements, whereby any of these elements can be left deflated, in accordance with the use required.

Still another object of the present invention resides in the provision of a cushion arrangement of the character described, in which one of the legs is attached to the door of the motor vehicle for ease in getting in or out of the vehicle, and which yet automatically takes its intended position when the door is closed.

Yet another object of the present invention resides in the provision of a cushion arrangement of the character described, which cannot only be used as a back-rest but also as an arm-rest, a seat cushion or a knee-cushion.

The foregoing and other important objects of the present invention will become apparent during the following disclosure and by referring to the drawings, in which.

In the drawings, like reference characters indicate like elements throughout.

The cushion assembly is made of three separate cushion elements, each preferably made of rubberized fabric or other air impermeable materials, so as to be air-inflatable. However, the cushion elements could be made of sponge rubber or other compressible material covered by a suitable fabric.

Figures 4, 5, 6:
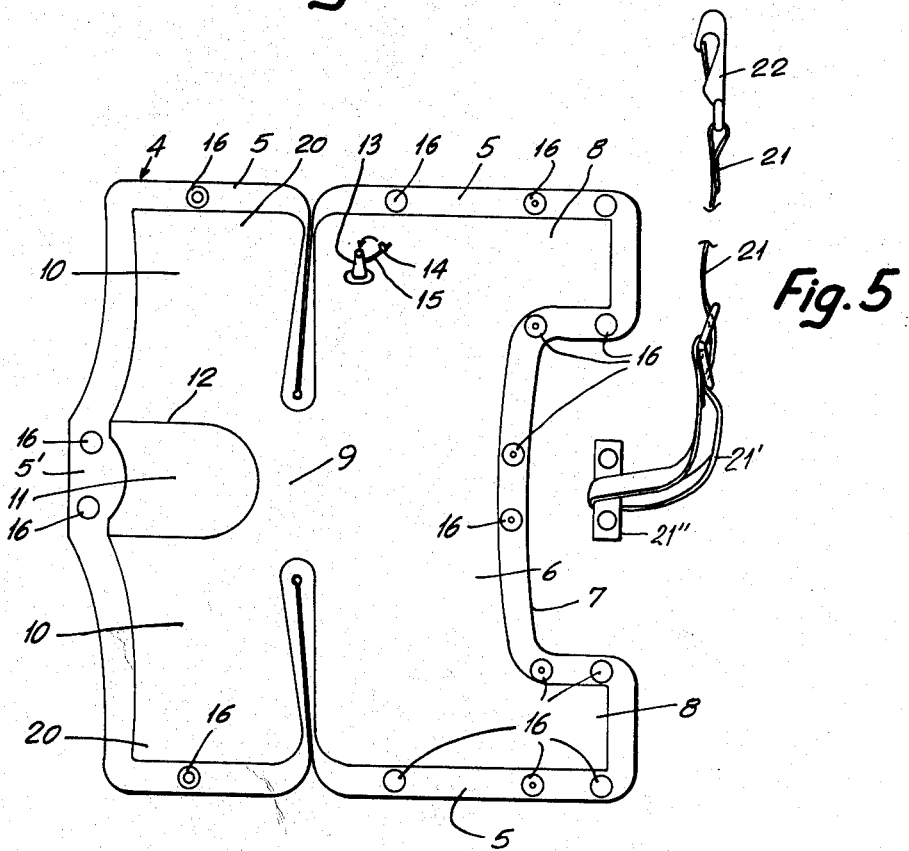
FIGURE 4 is a perspective view of the support roof bar.
FIGURE 5 is a partial perspective view of the strap for attaching the head-rest to the roof bar.
FIGURE 6 is a plan view of one of the three inflatable elements which form the head-rest and the two legs of the cushion assembly.

Preferably, for economy of manufacture the head-rest 1, inner side leg 2 and outer side leg 3 are made from substantially identically shaped air-inflatable elements 4, one of which is shown in FIGURE 6.

Element 4 consists of two plies of air impermeable material, such as rubberized fabric, plastic, and the like, which are sealed together at the periphery of the element 4, along marginal edge 5.

Element 4 defines a main portion 6, of generally rectangular shape, having one long side provided with a central recess 7, defining on each side thereof short extensions 8. The other opposite longitudinal edge of main portion 6 forms a bridge connection 9 opposite recess 7 for two side wings 10 separated from each other by a central non-inflatable area 11, defined by sealed line 12 joining with sealed margin 5.

Element 4 is inflated with air through nipple 13, closable by plug 14 attached to nipple 13 by flexible connector 15.

Male and female parts of pressure buttons 16 are located on margin 5 at suitable locations thereof.

Figure 1:
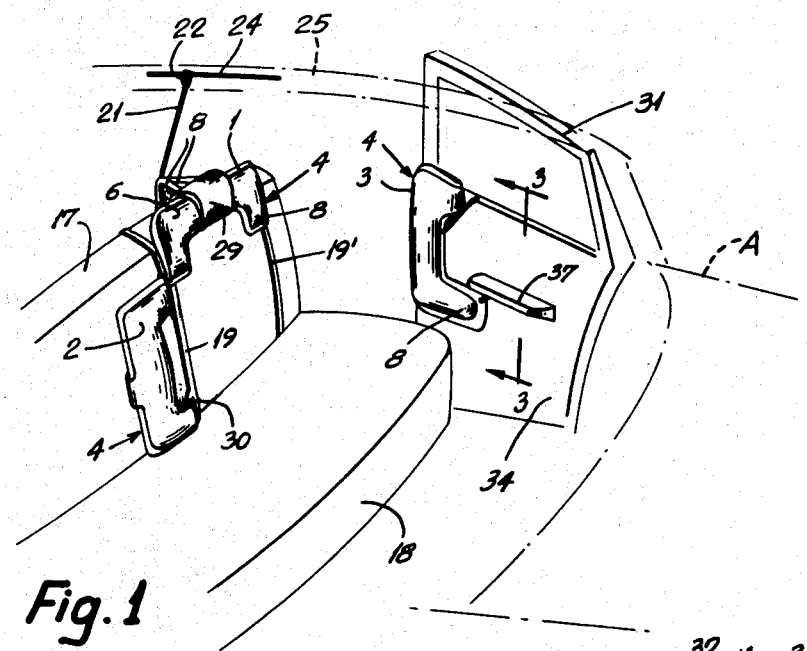
FIGURE 1 is a partial perspective view of the interior of a motor vehicle showing the front seat and the back-rest in accordance with the invention in operative position.

One element 4 is used as the head-rest 1, which is arranged at the top of the back 17 of the front automobile seat 18 in the following manner:

Inner and outer straps 19 and 19' surround back 17 at adjustable spaced-apart locations, as shown in FIGURE 1, and pressure button parts 16 on the extensions 8 of element 4 are removably attached to pressure button parts secured to straps 19, 19' such that main portion 6 extends horizontally with extensions 8 extending downwardly towards seat 18, as shown in FIGURE 1.

Figures 2, 3:
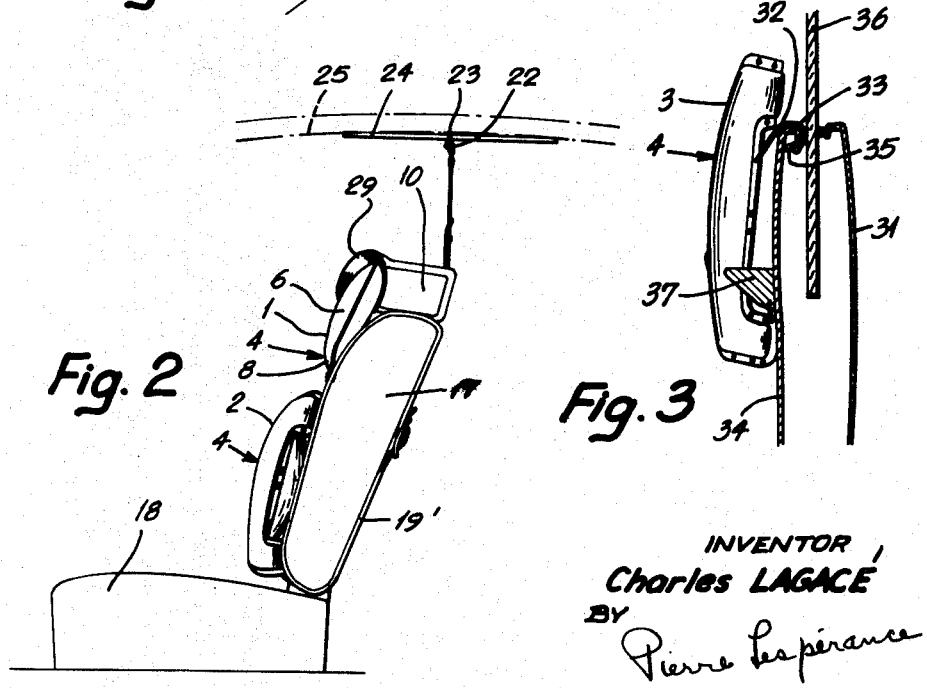
FIGURE 2 is a side elevation of the seat and part of the back-rest.
FIGURE 3 is a cross-section of the vehicle door showing one leg of the back-rest secured thereto.

Wings 10 are folded back towards each other to extend rearwardly over the top of back 17 and rest thereon, as shown in FIGURE 2. The outer ends 20 of wings 10 are attached together by pressure buttons 16.

Strap 21, shown in FIGURE 5, has an adjustable loop 21' surrounding a strip 21'' attached to the margin of recess 7 by pressure buttons 16. Said strap 21 extends rearwardly around the connected outer ends 20 of wings 10 and is provided at its upper end with a hook 22 removably attachable to a rider 23 (see FIGURE 4), which surrounds a roof bar 24. Said roof bar 24 is disposed longitudinally of the motor vehicle A and is attached to the roof 25 thereof above the portion of the seat 18 provided with the cushion arrangement of the invention.

Roof bar 24 is attached to roof 25 and, more particularly, to the roof liner by means of bendable claws 26, which can be easily pressed together by hand.

Rider 23 has a stud 27 engageable with any one of several spaced holes 28 made in roof bar 24, so as to adjust the point of attachment of strap 21 forwardly or rearwardly with respect to seat back 17.

Thus, by means of strap 21, the head-rest 1 can be swung forwardly or rearwardly with respect to its connections to the straps 19, 19' so as to be in a most comfortable position to support the shoulders and neck of the user. For additional support of the user's neck, a fabric covering 29 surrounds the central portion of the wings 10, said covering retaining cushion material, such as foam plastic, which can be moved about within the covering in accordance with the user's desire to suit his neck.

The level of head-rest 1 can be simply adjusted by connecting the pressure button parts on extensions 8 to any one of several pressure button parts secured to said straps 19, 19' and/or by sliding straps 19, 19' around seat back 17.

If desired, side wings 10 may be folded flat against the back of main portion 6 and the pressure button parts adjacent non-inflatable portion 11 attached to the pressure button parts in recess 7.

One element 4 is used to constitute the inner side leg 2. The side wings 10 are folded against the back of main portion 6 and attached by the above-noted pressure buttons or, preferably, the sealed margin portion 5' of the wing is permanently sealed to the central portion of the sealed margin of recess 7. Also, the outer ends 20 of wings 10 are attached to the ends of main portion 6 by pressure buttons.

The extensions 8 are folded back and attached by pressure buttons to form loops, in which is inserted a slit portion 30 of the inner strap 19. The inner side leg 2 extends laterally from the strap 19, as shown in FIGURE 1, and is vertically disposed at an adjustable level, said level being adjusted by sliding the inner strap 19 around back 17.

The outer side leg 3 is constituted by an element 4 folded in the same manner as the inner side leg 2 as regards the side wings 10, but the extensions 8 are not folded in loops. Outer side leg 3 is provided with hooks to removably secure the same to the front door 31 of the motor vehicle 4 at vertically spaced points.

A rubber band 32 extends from margin 5 and overlies the top curved portion 33 of the inside panel 34 of the front door 31 and is provided with a hook at its free end, removably engageable with anyone of several longitudinally spaced holes made in a holding bar 35, retained under the top portion 33 of the door.

The band 32 extends through the slit receiving the glass pane 36 of the door. The lower end of the outer side leg 33 is removably attached to the inside panel 34, preferably under the usual door arm-rest 37.

The location of side leg 3 is adjusted so that, upon closing of the door 31, said leg 3 will take a position bearing against the back 17 of seat 18 to complete the bucket-seat effect of the cushion arrangement in accordance with the invention.

The fact that outer leg 3 is attached to the door makes it easier for the vehicle passenger to get in or out of the vehicle.

While a preferred embodiment in accordance with the invention has been illustrated and described, it is understood that various modifications may be resorted to without departing from the scope of the appended claims.

What I claim is:

1. A cushion assembly for the front seat of a motor vehicle, said assembly adapted to be positioned on the back of said seat and comprising three separate cushion elements, each of elongated shape, one element adapted to be positioned substantially horizontally at the top of said back to form a head-rest and the other two elements adapted to be positioned vertically in spaced-apart position underneath said head-rest to form inner and outer legs engageable with the sides of the user's back, inner and outer straps surrounding said seat back in spaced-apart position, said head-rest extending across and adjustably secured to said spaced straps at the ends thereof, connection means connecting the central portion of said head-rest to the roof of said motor vehicle, said inner leg attached to said inner strap and said outer leg attached to the door of the motor vehicle in a position to take its operative position upon closing of said door, said connection means for connecting said head-rest to the roof of the motor vehicle comprising an adjustable strap attached at one end to the center part of said head-rest and having a hook at its free end, a bar provided with a plurality of spaced holes secured to the roof of said motor vehicle longitudinally thereof and above said seat back, and a rider encircling said bar and having a stud engageable with anyone of said bar holes, said hook removably attached to said rider.

2. A cushion assembly as claimed in claim 1, wherein each of said elements is an air-inflatable cushion.

3. A cushion assembly as claimed in claim 1, further including additional adjustable cushioning means surrounding the central portion of said head-rest and adapted to engage the user's neck.

4. An air inflatable cushion, made of two plies of airtight flexible material sealed together at their edges and defining a main portion of substantially rectangular shape, one longitudinal edge of which being recessed in the central portion thereof to form two side extensions, a bridge connection depending from the center portion of the other longitudinal edge of said main portion, and a pair of oppositely directed wings depending from said bridge portion and extending alongside said other longitudinal edge of said main portion, the end edges of said wings being substantially flush with the lateral edges of said main portion, part of said bridge connection being non-inflatable, first connection means on the edges of said side extensions to attach each extension in looped position, and second connection means on the end edges of said wings and on the lateral edges of said main portion, to attach the ends of said wings together with the wings folded one against the other, or to attach said wings to said main portion with said wings folded against said main portion.

References Cited by the Examiner

UNITED STATES PATENTS

| 247,823 | 10/81 | Hiller | 297—395 |
| 969,251 | 9/10 | Denzer | 297—397 |
| 1,855,408 | 4/32 | Montenegro | 297—395 |
| 2,606,755 | 8/52 | Samuels | 280—150 |

A. HARRY LEVY, *Primary Examiner.*